United States Patent
Coefield

(10) Patent No.: US 10,448,723 B1
(45) Date of Patent: Oct. 22, 2019

(54) POLISH CURING ASSEMBLY

(71) Applicant: Michael Coefield, Jacksonville, FL (US)

(72) Inventor: Michael Coefield, Jacksonville, FL (US)

( * ) Notice: Subject to any disclaimer, the term of this patent is extended or adjusted under 35 U.S.C. 154(b) by 0 days.

(21) Appl. No.: 15/947,388

(22) Filed: Apr. 6, 2018

(51) Int. Cl.
*A45D 29/00* (2006.01)
*B29C 35/08* (2006.01)
*A45D 44/04* (2006.01)

(52) U.S. Cl.
CPC .............. *A45D 29/00* (2013.01); *B29C 35/08* (2013.01); *A45D 44/04* (2013.01); *A45D 2029/008* (2013.01); *B29C 2035/0827* (2013.01)

(58) Field of Classification Search
CPC .. A45D 29/00; A45D 2200/205; A45D 44/02; G21K 5/02; A61N 2005/0642; A61N 2005/0661; A61N 5/0616; B01J 19/123; G02B 5/208
USPC .............. 250/455.11, 493.1, 515.1; 118/620; 34/275
See application file for complete search history.

(56) References Cited

U.S. PATENT DOCUMENTS

| 4,754,769 | A | 7/1988 | Flynn |
| D310,724 | S | 9/1990 | Jackson |
| 4,979,523 | A | 12/1990 | Grimm |
| 7,100,620 | B2 | 9/2006 | Fung |
| 7,712,473 | B1 | 5/2010 | Robinson et al. |
| 8,242,475 | B1 | 8/2012 | Cheng |
| 8,601,715 | B2 | 12/2013 | Tweedy, Jr. |
| D702,400 | S | 4/2014 | Valia et al. |
| 8,835,886 | B2 | 9/2014 | Vu |
| 9,713,371 | B1* | 7/2017 | Luu ................ A45D 29/00 |
| 10,117,494 | B1* | 11/2018 | Luu ................ A45D 29/00 |
| 2009/0143842 | A1* | 6/2009 | Cumbie ........... A61N 5/0616 607/88 |
| 2012/0045981 | A1* | 2/2012 | Nguyen ............ A45D 29/00 454/49 |
| 2012/0060757 | A1* | 3/2012 | Li .................... F26B 3/28 118/620 |
| 2013/0161531 | A1* | 6/2013 | Haile ............... A45D 29/00 250/455.11 |
| 2015/0082654 | A1 | 3/2015 | Jaegal |
| 2015/0290675 | A1* | 10/2015 | Lin ................. A45D 29/00 250/494.1 |
| 2016/0095412 | A1* | 4/2016 | Jih .................. B05C 9/14 34/275 |

* cited by examiner

*Primary Examiner* — David A Vanore

(57) ABSTRACT

A polish curing assembly for curing and hardening nail polish includes a stand is that may be rolled along a support surface. A light emitting unit is coupled to the stand and the light emitting unit is positionable above a person's hand whose nails have been polished. The light emitting unit emits electromagnetic radiation when the light emitting unit is turned on to cure polish on the nails.

14 Claims, 4 Drawing Sheets

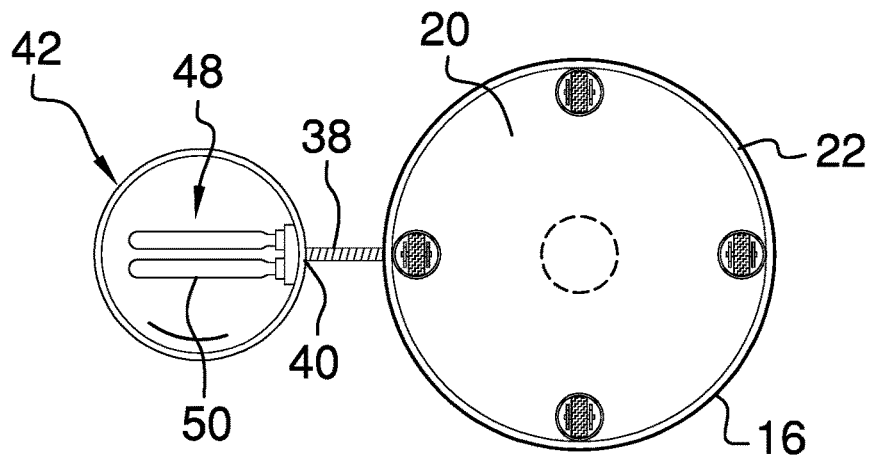
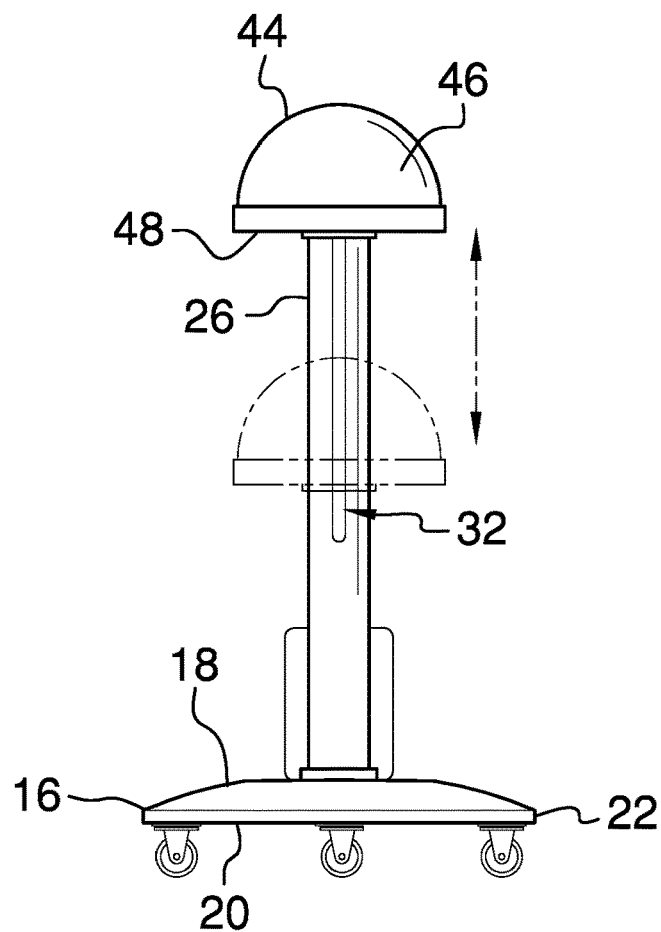
FIG. 2
FIG. 3

POLISH CURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to curing devices and more particularly pertains to a new curing device for curing and hardening nail polish.

BRIEF SUMMARY OF THE INVENTION

An embodiment of the disclosure meets the needs presented above by generally comprising a stand is that may be rolled along a support surface. A light emitting unit is coupled to the stand and the light emitting unit is positionable above a person's hand whose nails have been polished. The light emitting unit emits electromagnetic radiation when the light emitting unit is turned on to cure polish on the nails.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a bottom view of an embodiment of the disclosure.

FIG. 3 is a front view of an embodiment of the disclosure.

DETAILED DESCRIPTION OF THE INVENTION

Figure 1:
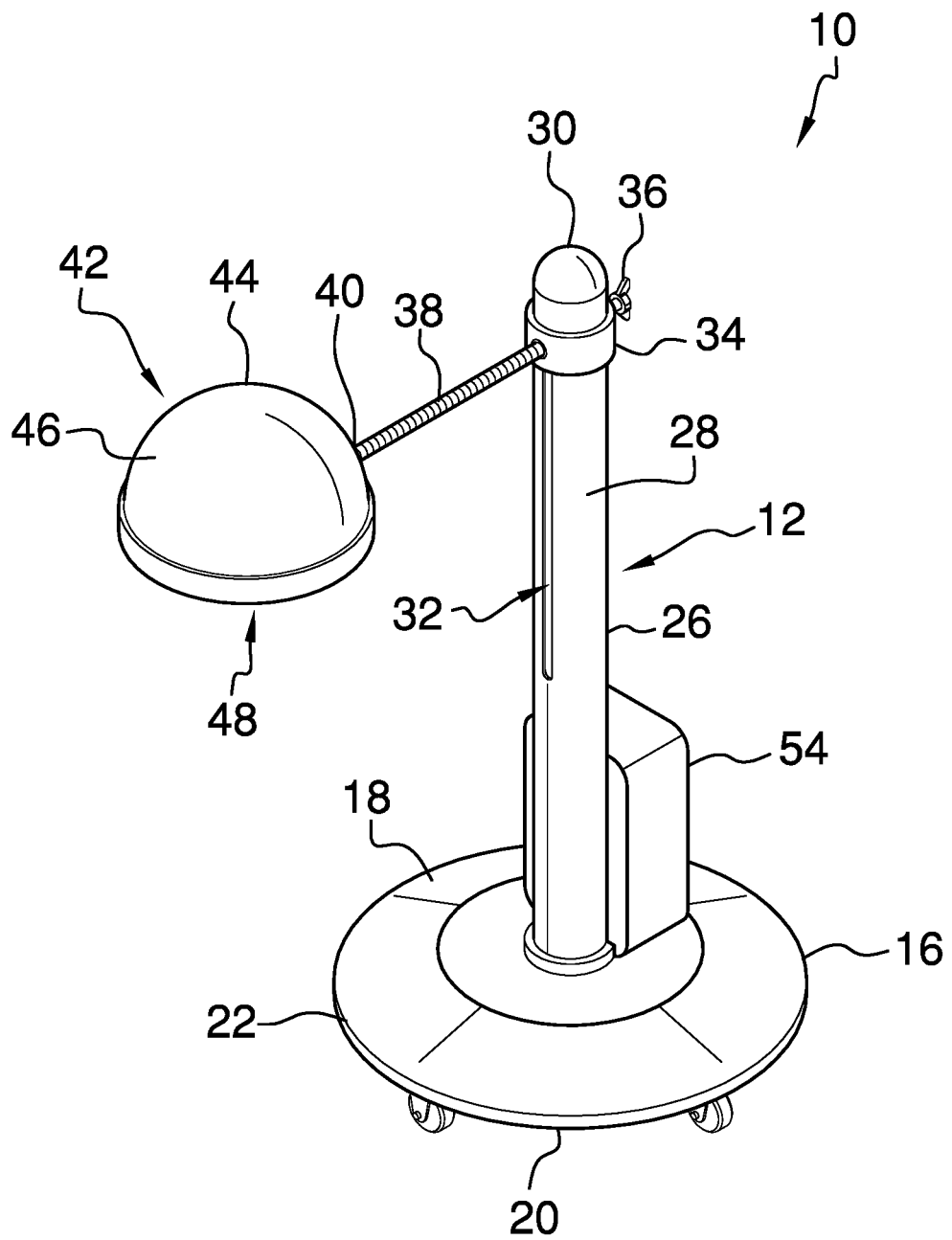
FIG. 1 is a top perspective view of a polish curing assembly according to an embodiment of the disclosure.
Figure 4:
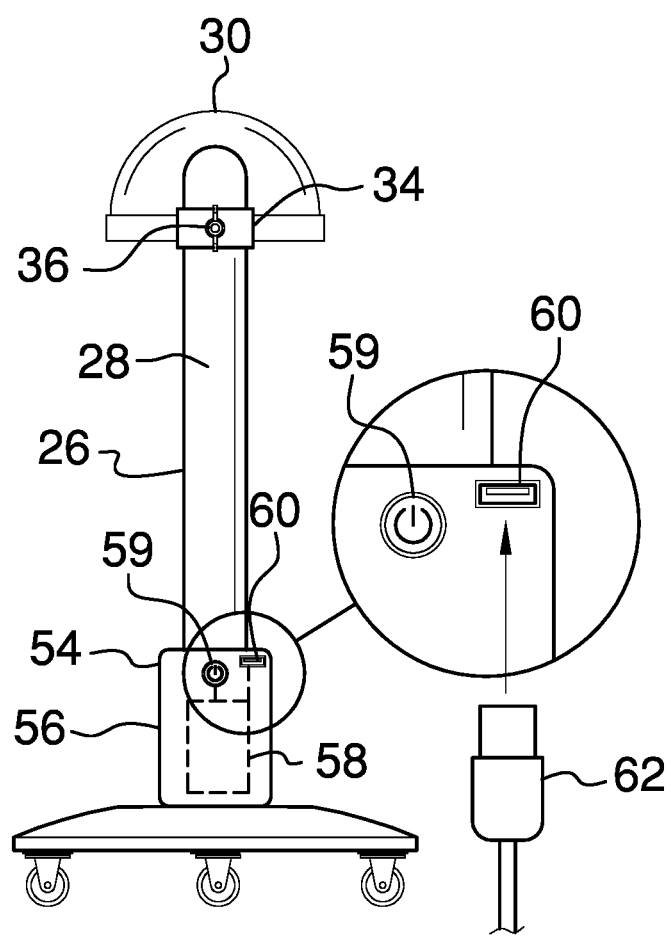
FIG. 4 is a back view of an embodiment of the disclosure.
Figure 5:
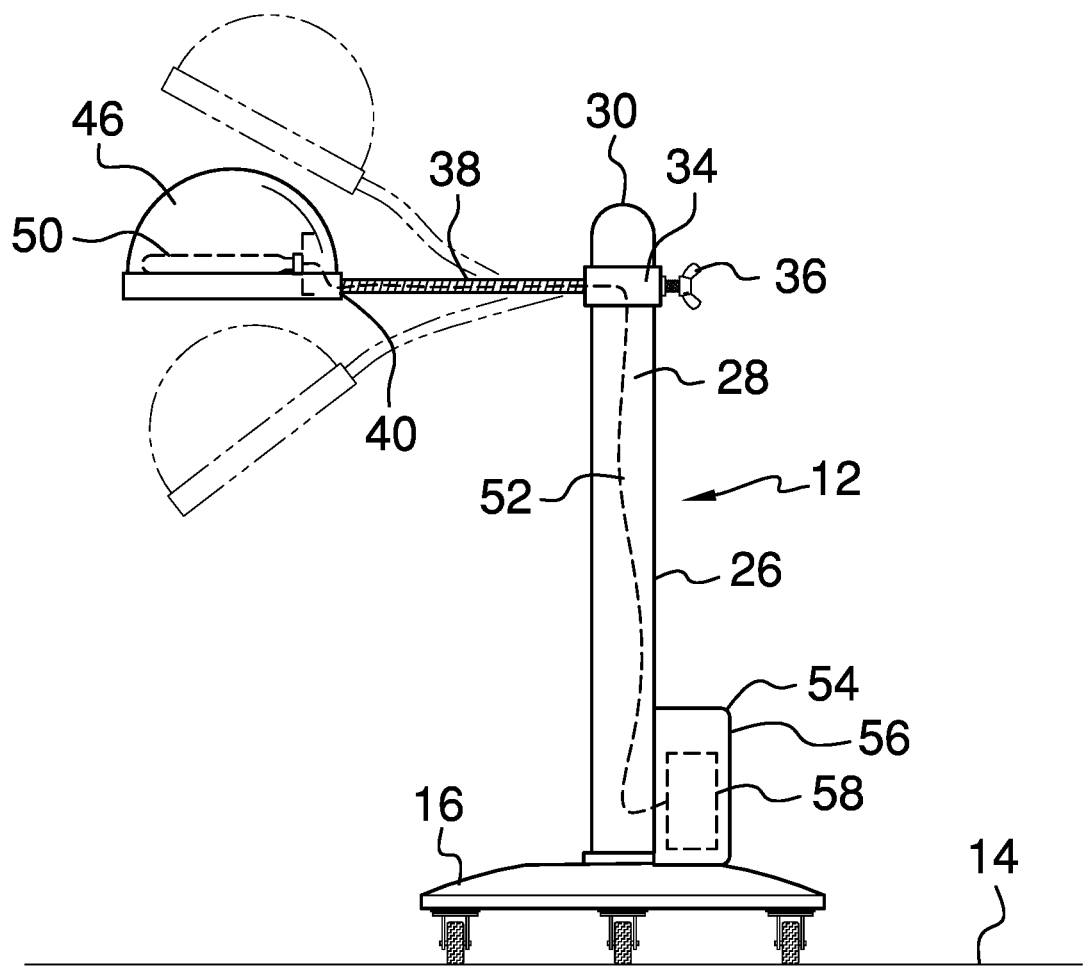
FIG. 5 is a phantom view of an embodiment of the disclosure.

With reference now to the drawings, and in particular to FIGS. 1 through 6 thereof, a new curing device embodying the principles and concepts of an embodiment of the disclosure and generally designated by the reference numeral 10 will be described.

As best illustrated in FIGS. 1 through 6, the polish curing assembly 10 generally comprises a stand 12 that may be rolled along a support surface 14 such as a floor or the like in a beauty salon. The stand 12 comprises a base 16 that has a top side 18, a bottom side 20 and a peripheral edge 22 extending therebetween. The peripheral edge 22 may be continuous such that the base 16 has a disk shape. A plurality of rollers 24 is provided and each of the rollers 24 is coupled to the bottom side 20 of the base 16 to roll along the support surface 14. Moreover, each of the rollers 24 may be casters, wheels and any other type of roller.

A tube 26 is coupled to and extends upwardly from the top side 18; the tube 26 has an outer wall 28 and a distal end 30 with respect to the top side 18. The outer wall 28 has a slot 32 extending into an interior of the tube 26 and the slot 32 extends downwardly from the distal end 30. A collar 34 is provided and the collar 34 is slidably positioned around the tube 26. Additionally, the collar 34 is positionable at a selected point along the tube 26 between the base 16 and the distal end 30 of the tube 26. A fastener 36 extends through the collar 34 and frictionally engages the outer wall 28 of the tube 26 to retain the collar 34 at a selected height on the tube 26. The fastener 36 may be a thumb screw or any other type of mechanical fastener 36 that can frictionally engage the tube 26.

An arm 38 is coupled to and extends laterally away from the collar 34 and the arm 38 is comprised of a bendable material. Thus, the arm 38 may be bent into a selected shape and the arm 38 remains in the selected shape. Alternatively, the arm 38 may be constructed with a plurality of articulating joints or the like. The arm 38 has a distal end 40 with respect to the collar 34.

A light emitting unit 42 is coupled to the stand 12. Additionally, the light emitting unit 42 is positionable above a person's hand or foot whose fingernails or toenails have been polished. The light emitting unit 42 emits electromagnetic radiation, such as ultra-violet light, when the light emitting unit 42 is turned on. Thus, the electromagnetic radiation from the light emitting unit 42 cures and hardens nail polish that has been applied to the person's fingernails or toenails.

The light emitting unit 42 comprises a bowl 44 that has an outer wall 46 and an opening 48 therein. The outer wall 28 is coupled to the distal end 40 of the arm 38 having the opening 48 being directed downwardly towards the base 16. The bowl 44 is comprised of a light reflecting material, such as polished steel or the like. A light emitter 50 is positioned within the bowl 44 to emit light outwardly through the opening 48 in the bowl 44. The light emitter 50 may be a UV light bulb or other electronic source of electromagnetic radiation.

A conductor 52 is electrically coupled to the light emitter 50 and the conductor 52 extends through the arm 38 and the slot 32 in the tube 26. Moreover, the conductor 52 extends through the collar 34 and the conductor 52 travels upwardly and downwardly in the slot 32 when the collar 34 is slid upwardly and downwardly along the tube 26. The conductor 52 may be an insulated electrical wire or the like.

A power supply 54 is coupled to the base 16 and the conductor 52 is electrically coupled to the power supply 54. Thus, the power supply 54 is an electrical communication with the light emitter 50. The power supply 54 comprises a housing 56 that is coupled to the top side 18 of the base 16. At least one battery 58 is positioned within the housing 56 and the at least one battery 58 is electrically coupled to the conductor 52. Moreover, the at least one battery 58 may be a rechargeable battery or the like.

A button 59 is coupled to the housing 56 and the button 59 is electrically coupled the conductor 52 to turn the light emitter 50 on and off. A charge port 60 is coupled to the housing 56 and the charge port 60 is electrically coupled to the at least one battery 58. The charge port 60 may be electrically coupled to a power source 62 for charging the at least one battery 58. Additionally, the charge port 60 may be a usb port or the like and the power source 62 may be a battery charger.

In use, the base 16 is positioned on the support surface 14 and the base 16 is rolled next to the person getting their fingernails or toenails polished. The collar 34 is slid along the tube 26 to position the arm 38 at a selected height and the bowl 44 is directed toward the persons' fingernails or toenails. The button 59 is pushed to turn the light emitter 50 on and the emitted electromagnetic radiation cures and hardens the polish on the fingernails or toenails. In this way the quality of the polish is enhanced with respect to the finish and the hardness of the polish. Additionally, the power supply 54 is electrically coupled to the power source 62 to charge the power supply 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A polish curing assembly being configured to emit light on to nail polish to cure the nail polish, said assembly comprising:
    a stand being configured to be rolled along a support surface, said stand comprises a base having a top side and a bottom side; and
    a light emitting unit being coupled to said stand wherein said light emitting unit is configured to be positioned above a person's hand whose nails have been polished, said light emitting unit emitting electromagnetic radiation when said light emitting unit is turned on wherein said light emitting unit is configured to cure polish on the nails; and
    a tube being coupled to and extending upwardly from said top side, said tube having an outer wall and a distal end with respect to said top side, said outer wall having a slot extending into an interior of said tube, said slot extending downwardly from said distal end.

2. The assembly according to claim 1, further comprising a plurality of rollers, each of said rollers being coupled to said bottom side of said base wherein each of said rollers is configured to roll along the support surface.

3. The assembly according to claim 1, further comprising a collar being slidably positioned around said tube.

4. The assembly according to claim 3, further comprising a fastener extending through said collar and frictionally engaging said outer wall of said tube to retain said collar at a selected height on said tube.

5. The assembly according to claim 3, further comprising an arm being coupled to and extending laterally away from said collar, said arm being comprised of a bendable material, said arm having a distal end with respect to said collar.

6. A polish curing assembly being configured to emit light on to nail polish to cure the nail polish, said assembly comprising:
    a stand being configured to be rolled along a support surface; and
    a light emitting unit being coupled to said stand wherein said light emitting unit is configured to be positioned above a person's hand whose nails have been polished, said light emitting unit emitting electromagnetic radiation when said light emitting unit is turned on wherein said light emitting unit is configured to cure polish on the nails;
    said stand including an arm having a distal end and a base; and
    said light emitter unit comprising a bowl having an outer wall and an opening therein, said outer wall being coupled to said distal end of said arm having said opening being directed downwardly towards said base.

7. The assembly according to claim 6, further comprising a light emitter being positioned within said bowl wherein said light emitter is configured to emit light outwardly through said opening in said bowl.

8. The assembly according to claim 7, further comprising a conductor being electrically coupled to said light emitter, said conductor extending through said arm and said slot in said tube.

9. The assembly according to claim 8, further comprising a power supply being coupled to said base, said conductor being electrically coupled to said power supply such that said power supply is an electrical communication with said light emitter.

10. The assembly according to claim 9, wherein said power supply comprises a housing being coupled to a top side of said base.

11. The assembly according to claim 10, further comprising at least one battery being positioned within said housing, said at least one battery being electrically coupled to said conductor.

12. The assembly according to claim 11, further comprising a button being coupled to said housing, said button being electrically coupled said conductor to turn said light emitter on and off.

13. The assembly according to claim 12, further comprising a charge port being coupled to said housing, said charge port being electrically coupled to said at least one battery, said charge port being configured to be electrically coupled to a power source for charging said at least one battery.

14. A polish curing assembly being configured to emit light on to nail polish to cure the nail polish, said assembly comprising:
   a stand being configured to be rolled along a support surface, said stand comprising:
      a base having a top side and a bottom side;
      a plurality of rollers, each of said rollers being coupled to said bottom side of said base wherein each of said rollers is configured to roll along the support surface;
      a tube being coupled to and extending upwardly from said top side, said tube having an outer wall and a distal end with respect to said top side, said outer wall having a slot extending into an interior of said tube, said slot extending downwardly from said distal end;
      a collar being slidably positioned around said tube;
      a fastener extending through said collar and frictionally engaging said outer wall of said tube to retain said collar at a selected height on said tube;
      an arm being coupled to and extending laterally away from said collar, said arm being comprised of a bendable material, said arm having a distal end with respect to said collar; and
   a light emitting unit being coupled to said stand wherein said light emitting unit is configured to be positioned above a person's hand whose nails have been polished, said light emitting unit emitting electromagnetic radiation when said light emitting unit is turned on wherein said light emitting unit is configured to cure polish on the nails, said light emitting unit comprising:
      a bowl having an outer wall and an opening therein, said outer wall being coupled to said distal end of said arm having said opening being directed downwardly towards said base;
      a light emitter being positioned within said bowl wherein said light emitter is configured to emit light outwardly through said opening in said bowl;
      a conductor being electrically coupled to said light emitter, said conductor extending through said arm and said slot in said tube; and
      a power supply being coupled to said base, said conductor being electrically coupled to said power supply such that said power supply is an electrical communication with said light emitter, said power supply comprising:
         a housing being coupled to said top side of said base;
         at least one battery being positioned within said housing, said at least one battery being electrically coupled to said conductor;
         a button being coupled to said housing, said button being electrically coupled said conductor to turn said light emitter on and off; and
         a charge port being coupled to said housing, said charge port being electrically coupled to said at least one battery, said charge port being configured to be electrically coupled to a power source for charging said at least one battery.

\* \* \* \* \*